UNITED STATES PATENT OFFICE.

ROBERT KESLER, OF PHILADELPHIA, PENNSYLVANIA.

METHOD OF MAKING ARTIFICIAL SLATE.

No. 907,608.  Specification of Letters Patent.  Patented Dec. 22, 1908.

Application filed January 20, 1908. Serial No. 411,710.

*To all whom it may concern:*

Be it known that I, ROBERT KESLER, a citizen of the United States, residing in the city and county of Philadelphia, State of Pennsylvania, have invented a new and useful Method of Making Artificial Slate, of which the following is a specification.

My present invention consists in a novel method of making an artificial slate which can be very cheaply produced and is adapted to be employed for all purposes in which slate is used, such as switch boards, electrical insulating purposes and roofing.

In carrying out my invention, I take one hundred pounds of slow hardening cement; nine to ten pounds of mangan black or other coloring matter; one to one and one-half pounds of hair, preferably using for this purpose, short cow hair; nine to ten pounds of lime and nine to ten liters of water. These ingredients are all mixed together and the resultant mass is then heated until it has a uniform consistency throughout its mass. It is then poured on to glass plate molds of the desired size after which it is allowed to cool, set and harden. The artificial slate thus produced is now ready to be used for any desired purpose.

It is essential, if the best result is to be obtained, that a cement which is slow hardening be employed. If a dark colored slate is to be employed, mangan black is employed for the coloring matter but it is, of course, understood that any other desired coloring matter may be substituted therefor, if desired. The hair employed is preferably short cow hair but any suitable kind of hair may be used. In case the mass is too thick, I can add rain water in desired quantities to accomplish the result.

It is very advantageous, in case a substance is to be used for insulating purposes, that it be free from pores, since if moisture gets into the same the insulating properties of the material are thereby deteriorated. If a slow hardening cement is employed the water evaporates more slowly therefrom so that the product will be non-porous and will have substantially the same consistency throughout its mass. One species of cement which is adapted to be employed in my method is the well known Portland cement, although it is to be understood that I do not desire to be limited to the employment of Portland cement, since any kind of slow hardening cement may be employed with advantageous results.

In a device of this character the insulating properties of the material will be very much deteriorated if not entirely destroyed if any metal or similar article is employed for stiffening the material and preventing the same from becoming easily broken. In order to produce a material having the desired stiffness I employ instead of metal fibers, preferably lime and hair. In my novel construction of artificial slate the lime employed therein tends to fill up any pores which might be formed, thereby increasing the insulating properties of the slate since I am thereby enabled to obtain a substantially non-porous material. By the employment of both the lime and the hair the liability of the slate becoming broken is reduced to a minimum, and I obtain a material which is much stronger than if said elements were dispensed with.

In so far as I am aware I am the first in the art to devise a material composed of the elements herein described, and my claims to such a material and the method of producing the same are to be interpreted with corresponding scope.

Having thus described my invention, what I claim as new and desire to secure by Letters Patent, is:—

1. The method of making artificial slate which consists in mixing together a slow hardening cement, coloring matter, hair, lime and water, heating the resultant mass until it has a uniform consistency and then pouring it into molds.

2. The method of making artificial slate which consists in mixing together a slow hardening cement, coloring matter, hair, lime and water, heating the resultant mass until it has a uniform consistency and then pouring it into glass molds.

3. The method of making artificial slate which consists in mixing together one hundred pounds of slow hardening cement, nine to ten pounds of coloring matter, one to one and a half pounds of short hair, nine to ten pounds of lime and nine to ten liters of water, then heating the resultant mass until it has a uniform consistency and then pouring it into a glass mold.

4. The method of making artificial slate which consists in mixing together one hundred pounds of slow hardening cement, nine to ten pounds of mangan black, one to one and a half pounds of short hair, nine to ten pounds of lime and nine to ten liters of water, then heating the resultant mass until it has a uniform consistency and then pouring it into a glass mold.

5. As a new article of manufacture, an artificial slate comprising a composition of slow hardening cement, coloring matter, hair, lime and water.

6. The method of making artificial slate for insulating purposes, which consists in mixing together a slow, hardening cement, coloring matter, hair, lime and water until the resultant mass has a uniform consistency, and then pressing the material into molds.

ROBERT KESLER.

Witnesses:
C. D. McVay,
J. C. McGlashen.